Dec. 1, 1964    W. CASTEDELLO ETAL    3,159,841
MOTION PICTURE FILM PROJECTOR AND EDITOR
Filed Dec. 19, 1960    7 Sheets-Sheet 1
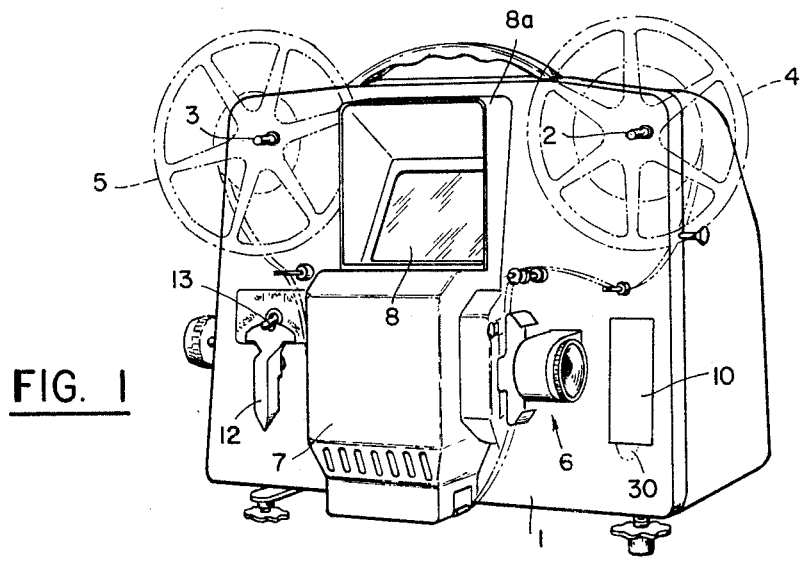
FIG. 1
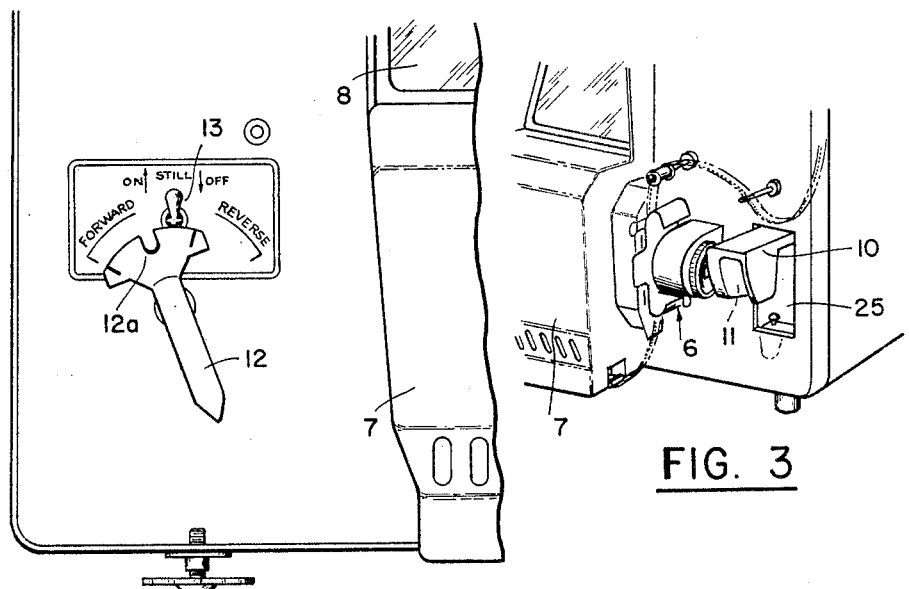
FIG. 2
FIG. 3
INVENTORS
WILLIAM CASTEDELLO
WERNER K. BENDER
BY Hanes and Wydick
ATTORNEYS

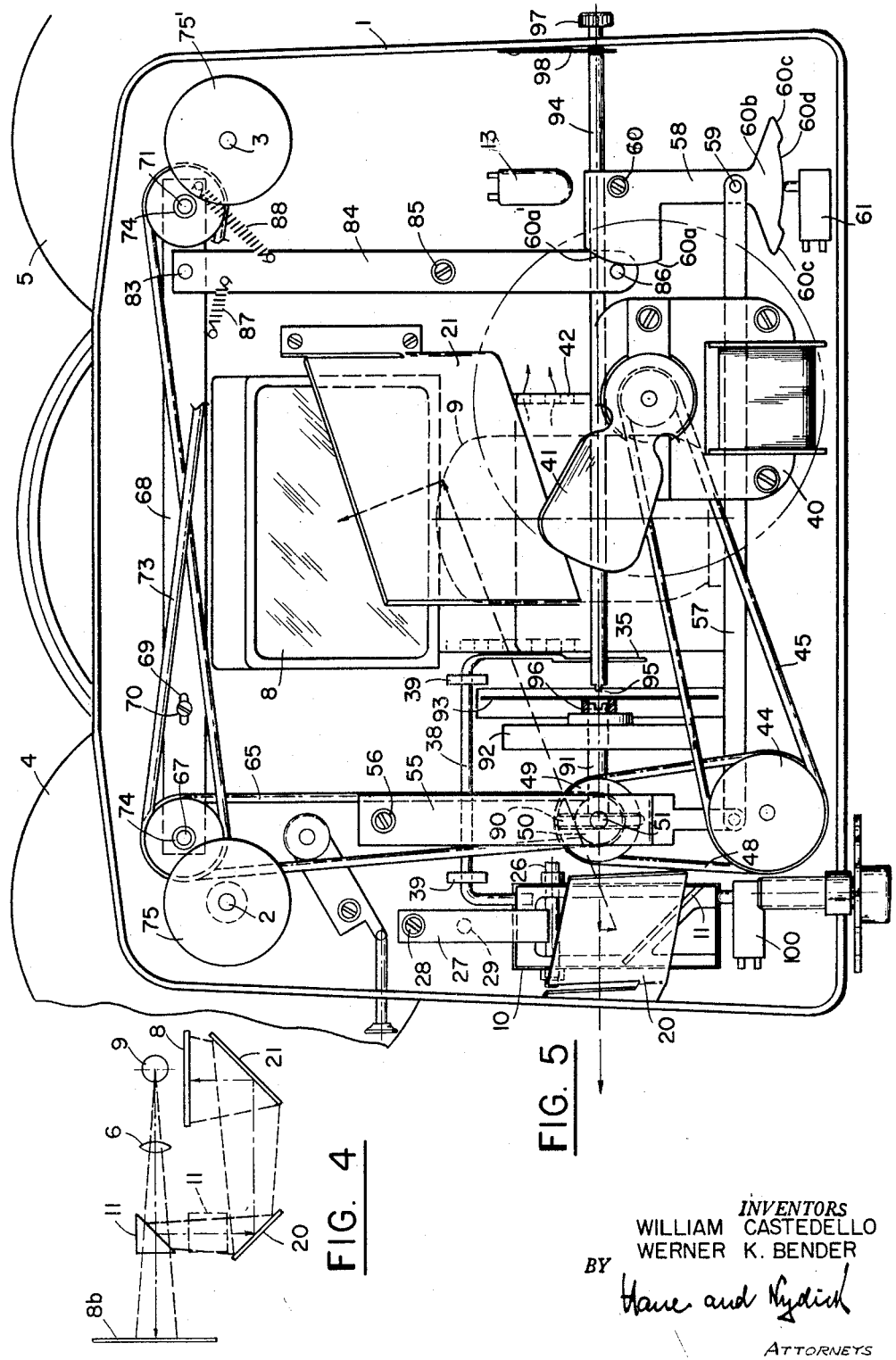

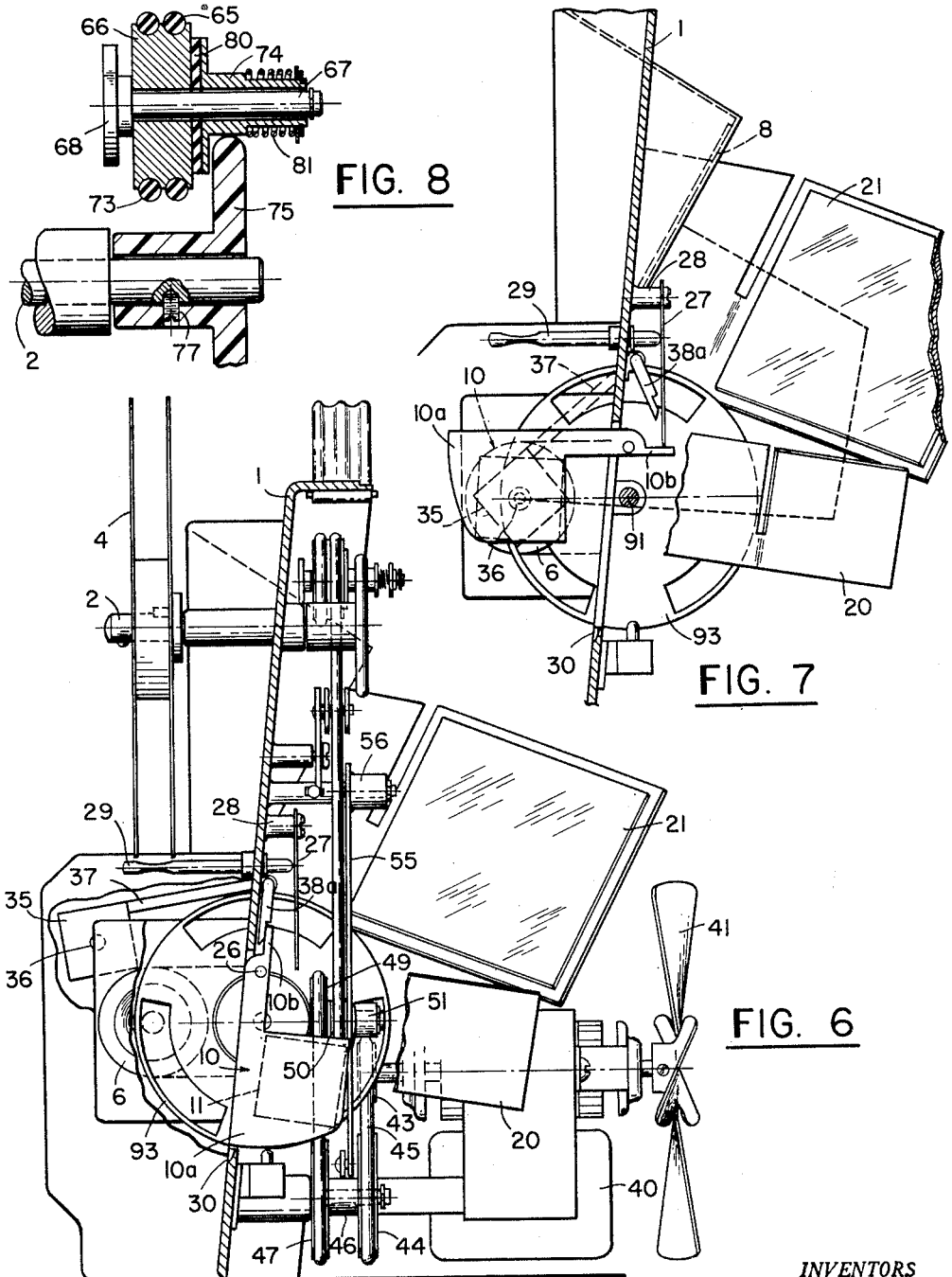

Dec. 1, 1964  W. CASTEDELLO ETAL  3,159,841
MOTION PICTURE FILM PROJECTOR AND EDITOR
Filed Dec. 19, 1960  7 Sheets-Sheet 6

INVENTORS
WILLIAM CASTEDELLO
WERNER K. BENDER
BY
Hane and Nydick
ATTORNEYS

United States Patent Office 3,159,841
Patented Dec. 1, 1964

3,159,841
MOTION PICTURE FILM PROJECTOR
AND EDITOR
William Castedello, and Werner K. Bender, Plainville, Conn., assignors to The Kalart Company Inc., Plainville, Conn.
Filed Dec. 19, 1960, Ser. No. 76,674
23 Claims. (Cl. 352—104)

The present invention relates to apparatus for projecting motion picture film selectively either upon a screen separate from the apparatus or upon a viewing screen built in the apparatus for purpose of viewing and/or editing.

There are known and on the market numerous designs of film projectors and also numerous designs of motion picture editors. It is also known to mount the standard components of a projector and an editor in a common frame. However, projector-editor units as heretofore known, are bulky, heavy and expensive as they include practically all the components of two separate apparatus.

Accordingly, it is the broad object of the present invention to provide a novel and improved projector-editor of the general kind above referred to, which is compact, light in weight and comparatively inexpensive.

A more specific object of the invention is to provide a novel and improved projector-editor in which most of the components of the optical system, especially the more expensive components thereof, are common to the projector assembly and the editor assembly of the combination unit.

Another specific object of the invention is to provide a novel and improved projector-editor combination unit in which not only most of the optical components, but also most of the mechanical components such as the film drive are common to both the projector assembly and the editor assembly of the unit.

Still another object of the invention is to provide a novel and improved projector-editor combination unit which can be converted from operation as projector to operation as editor and vice-versa, by simply shifting a linking component in the common optical system from one position into another. Such shift can be effected without disassembly or use of tools.

It is also an object of the invention to provide a novel and improved projector-editor unit which includes means for regulating the rate of speed of the film transport and for reversing the direction of the film transport for rewind after completion of the projection of a film, or reverting to selected frames during editing, the mechanism for such speed control and control of direction of the film transport being common to the projector and the editor of the combination unit.

A further object of the invention is to provide a novel and improved projector-editor which includes means for conveniently and selectively regulating the speed of the film transport of the apparatus both for forward winding and rewinding of the film and also means for stoppage of the film transport while a frame of the film is projected on the built-in screen as is desirable for editing.

A still further object of the invention is to provide a novel and improved projector-editor which includes means automatically reducing the light output of the lamp of the apparatus when the film is projected upon the built-in viewing screen as for viewing an image upon said screen a less intense illumination is sufficient and desirable, and automatically shifting to full light output when the film is to be projected upon the external screen at a normal rate of speed.

Other and further objects, features and advantages of the invention will be pointed out hereinafter and set forth in the appended claims forming part of the application.

In the accompanying drawing several preferred embodiments of the invention are shown by way of illustration and not by way of limitation.

In the drawing:

FIG. 1 is a perspective front view of the apparatus according to the invention, the apparatus being shown turned off and set for outside projection on a screen.

FIG. 2 is an enlarged fragmentary front elevational view, the machine being set for running at normal forward speed.

FIG. 3 is a fragmentary perspective front view showing the apparatus set for internal viewing on its built-in screen.

FIG. 4 is a diagram of the optical system of the apparatus.

FIG. 5 is a rear elevational view showing the apparatus set as illustrated in FIG. 1.

FIG. 6 is a partially broken end elevational view of FIG. 5.

FIG. 7 is a fragmentary end elevational view, the apparatus being set as shown in FIG. 3.

FIG. 8 is a sectional view of the slip-drive and the clutch-drive arrangement used at both the storage and the take-up reel spindle of the apparatus.

Figure 9:
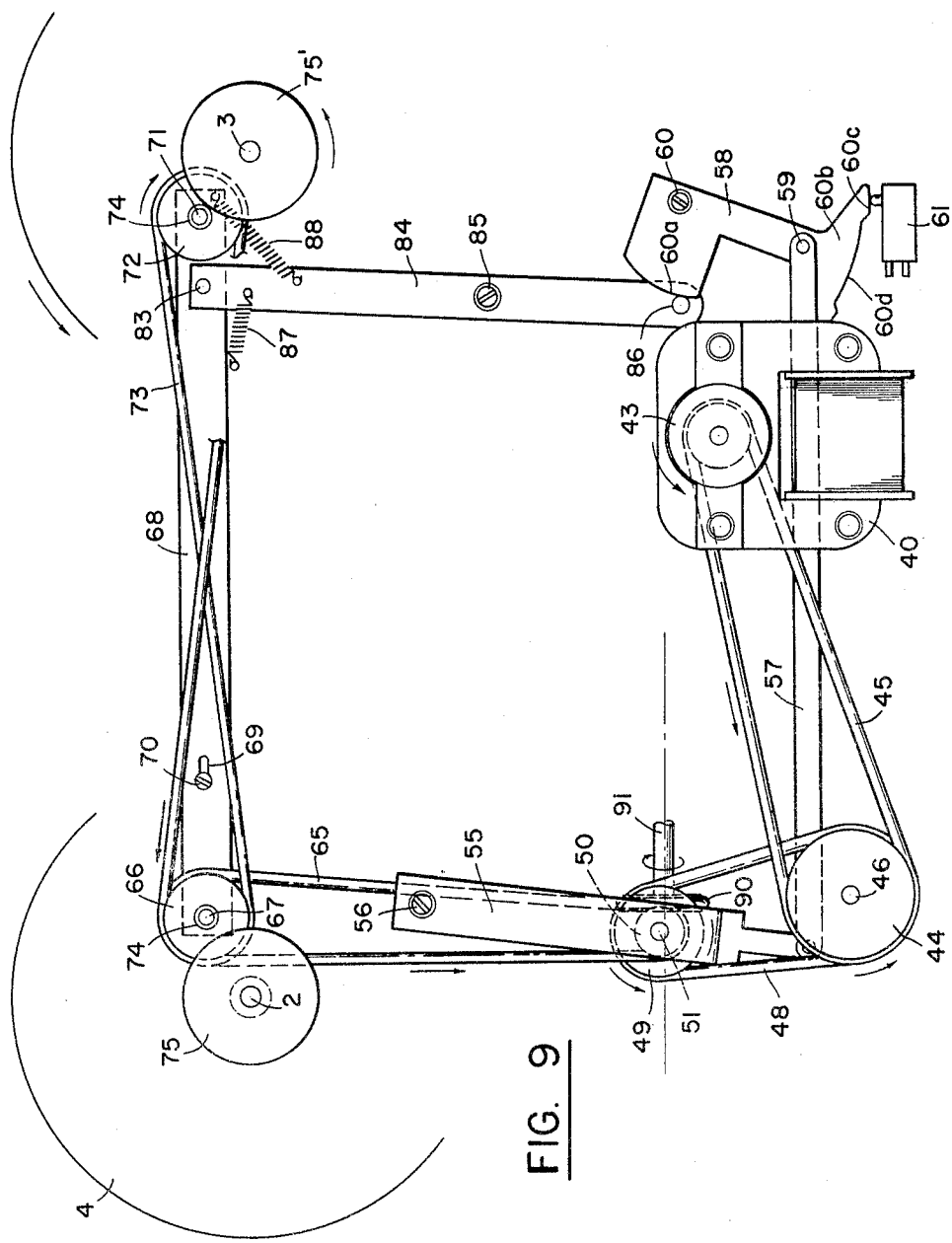
FIG. 9 is a diagrammatic elevational view showing the transmission means of the apparatus set for normal speed forward drive.

Referring now to the figures in detail, FIG. 1 shows an overall perspective view of the apparatus as it appears from the outside. The apparatus is encased in a housing 1 made of metal and/or plastic. There are visible on the front wall of the housing, that is on the side which the user of the apparatus will generally face, two reel spindles 2 and 3 for a film supply reel 4 and a film take-up reel 5, respectively. There is further visible the lens system, generally designated 6, and a casing 7. The casing houses the light source, such as a lamp 9 of the kind generally used in apparatus of the kind here involved and the shutter assembly.

The lens system should be visualized as being of conventional design, that is, as including lens components capable of projecting a beam of light modulated in accordance with the pictures on the film to be projected. Similarly, the shutter assembly should be visualized as being of conventional design and may include the usual Geneva or Maltese-cross arrangement. The blades of the shutter assembly are so spaced and dimensioned that standing images of the film frames are obtained either on a remote screen or a built-in screen. The general arrangement of the shutter assembly does not constitute part of the present invention and it should be assumed that the lens system in conjunction with the shutter assembly operate in the usual manner of a motion picture film projector. Certain parts of the shutter assembly and its drive, to the extent they are essential for the understanding of the invention, will be more fully described hereinafter and they are also illustrated in subsequent figures.

The front face of the apparatus includes a viewing screen 8 which is shielded by a hood 8a. There is also visible a plate-shaped door or arm 10 which may either occupy the position of FIG. 1 substantially flush with the face plate of the apparatus housing or the forwardly tilted position of FIG. 3. Arm 10 mounts a mirror 11 which in the position of FIG. 3 intercepts the light beam emanating from lens system 6 and in the position of FIG. 1 clears the path of the light beam.

As previously explained, the apparatus according to the invention is designed either to project images upon a screen or wall surface remote from the apparatus or upon the built-in viewing screen 8. Arm 10, or more specifically, mirror 11 mounted on arm 10 serves to effect the conversion of the apparatus from one operation to the other by selectively placing the arm in the beam clearing position of FIG. 1 in which the beam is projected upon an external viewing surface or in the beam intercepting position of FIG. 3 in which the images to be viewed appear on viewing screen 8. The manner in which arm 10 and mirror thereon exercise their functions will be explained more fully hereinafter.

At the lower left-hand corner of the apparatus there is visible an actuating arm 12, the position of which controls the transport of the film as to rate of speed and direction. The several settings of the apparatus are indicated in FIG. 2. The front face of the apparatus also includes the knob 13 of an "on" and "off" switch which physically coacts with arm 12 by engaging and locking arm 12 when the same is in its "up" and "down" position and knob 13 is in the "off" position. To this end arm 12 has a detent 12a which is engageable by knob 13 as is shown in FIG. 1. The "up" and "down" position of arm 12 is the "still" position of the apparatus, that is, the projected image remains stationary. When the apparatus is used for editing, it is often desirable to arrest an image on viewing screen 8, to decide whether the corresponding frame is to be retained in the film to be edited or not.

Turning now to FIG. 4, this figure shows diagrammatically the light paths for projecting either upon an external screen 8b or the built-in screen 8. The optical system of the apparatus comprises, in addition to mirror 11 which is pivotal between the positions indicated by full lines and dotted lines, a second stationary mirror 20 and a third stationary mirror 21. Instead of mirrors other light deviating means such as prisms may, of course, also be used.

As is evident from FIG. 4 mirror 11 when in its dotted position, is withdrawn from the path of a light beam emanating from lens system 6. However, when mirror 11 is in its full line position it will intercept the light beam and deflect it upon mirror 20, which in turn will deflect the beam upon mirror 21, and the latter mirror will deflect the beam upon built-in screen 8. In other words, the apparatus is set for projection upon an external screen when mirror 11 is in the dotted line position and for projection upon built-in screen 8 when mirror 11 is in the full line position.

*Assemblage for Linking Mirror 11*

Arm or plate 10 which constitutes in effect a door for a cutout 25 provided in the front face of housing 1 and mounts mirror 11 is pivoted to the housing by means of a pivot pin 26 to form a two-arm lever. The lower or longer part 10a of arm 10 constitutes a frame structure in which mirror 11 is secured. The bottom surface of arm part 10a is curved as can best be seen in FIG. 6, for a purpose which will be more fully explained hereinafter. The upper and shorter part 10b of the arm serves a dual purpose. As previously explained, and shown in FIGS. 1 and 6, arm 10 may either occupy a position clearing the path of the light beam or the position of FIGS. 3 and 7 intercepting the light beam. The arm is pivoted into the latter position by hand and is retained in this position by a leaf spring 27 secured to the front wall of housing 1 by a stud 28 or other suitable means. The free end of spring 27 slides over part 10b, which preferably terminates in a tongue, when the arm is tilted from the position of FIG. 6 into the position of FIG. 7. In order to free the arm from engagement with spring 27, a pin 29 is slidably extended through front wall of housing 1. As is evident, pressure against the end of the pin protruding from the housing will force spring 27 off arm part 10b. The arm will drop by its own weight into the position of FIG. 6 or close thereto and may then be manually pressed into its position substantially flush with the front wall of housing 1. To facilitate lifting of the arm from the position of FIG. 1 or FIG. 6 a depression 30 may be provided in the housing wall.

Figure 12:
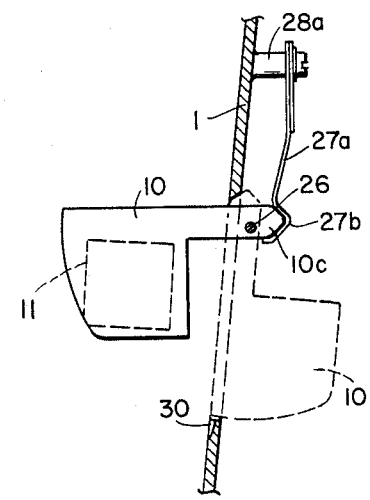
FIG. 12 is a modification of the assembly for changing from external projection to internal projection and vice versa.

FIG. 12 shows a modification of the assembly for retaining door plate 10 supporting mirror 11 in its open position. According to FIG. 12, door plate 10 terminates in a tapered portion 10c. This portion coacts with a correspondingly shaped terminal portion 27b of a spring 27a secured to housing 1 by means of a stud 28a or any other suitable means. As is evident from FIG. 12, engagement of plate portion 10c and spring portion 27b retain the door in the open position. As is further evident from FIG. 12, the door can be closed by simply pushing it downwardly into the dotted position. The springiness of spring 27a permits disengagement of portions 10c and 27b and will also effect re-engagement of the two portions when the door is turned upwardly.

As has been explained before, it is desirable that the light incident upon viewing screen 8 is reduced in comparison with the light incident upon a remote screen on which the maximum available illumination is desirable. To this end, the light output of lamp 9 is reduced as more fully explained hereinafter. A heat shield is interposed in the beam of light when mirror 11 is placed in its intercepting position. The heat shield is shown as a flag 35 having an aperture 36 of appropriate diameter. Aperture 36 is preferably closed by a glass plate to shield the film from the heat of the lamp. Such shielding is desirable during editing when the film is moving slowly, or even stands still. Flag 35 is secured to a rod 37, which in turn is attached to or integral with a U-shaped member 38. As can best be seen in FIG. 5, member 38 is pivotally secured with its bight to a wall of housing 1 by means of brackets 39. The depending branch 38a of member 38 is set off to coact with the tongue-shaped part 10b.

As appears from FIGS. 6 and 7, arm part 10b engages branch 38a when door 10 is in the position of FIG. 6 thereby holding the heat shield in the position raised above the light beam emanating from lens system 6. When now door 10 is moved from the position of FIG. 6 into the position of FIG. 7, parts 10b and 38a become disengaged and the heat shield drops by its own weight into the position of FIG. 7 in which the aperture 36 is aligned with the light beam thereby cutting down the intensity of the heat reaching the film. When door 10 is returned from the position of FIG. 7 into the position of FIG. 6 parts 10b and 38a will automatically re-engage each other whereby the heat shield is again lifted out of the path of the light beam.

*Driving Assemblage of the Apparatus*

The drive for all the components of the apparatus that are to be driven, is derived from a common drive motor 40 of suitable design. One end of the drive shaft seats a fan wheel 41 which serves to circulate air through the interior of housing 1 and especially through a compartment 42 in which lamp 9 is disposed. The other end of the drive shaft seats a pulley 43 which drives a pulley 44 by means of a belt 45. Pulley 44 is seated on a shaft 46 rotatably mounted in housing 1 and mounts a second pulley 47. Pulley 47 drives by means of a belt 48 a pulley 49 which is seated on a common shaft 51 also seating a smaller pulley 50. Shaft 51 for pulleys 49 and 50 is supported on a bar 55 which is pivoted on one end to a wall of housing 1 by means of a pivot 56. The free end of bar 55 is pivoted to a link 57, which in turn is pivoted at 59 to a control member 58. Control member 58 is disposed on the inside of the front wall of the housing opposite to control lever 12 and joined to it through the wall by a pivot pin 60 so that turning of lever 12 toward any of the operational positions marked in FIG. 2 results in a corresponding positioning of control lever 58.

Control lever 58 is formed on one end with a camming surface 60a to effect a mechanical control action which will be more fully described hereinafter and terminates at the other end in a switch control portion 60b. The switch control portion has a curved surface, the curvature of which is concentric with pivot point 60 of the lever. The two outer portions 60c are raised in reference to the middle portion 60d. The surface configuration 60c, 60d is utilized to control the state of a switch 61 which is so arranged that it is in one state of operation when its actuating member is engaged by the middle portion 60d and in another state of operation when its actuating member is engaged by either one of raised portions 60c. The electric control circuit of the apparatus will be more fully explained in connection with FIG. 16.

Figure 10:
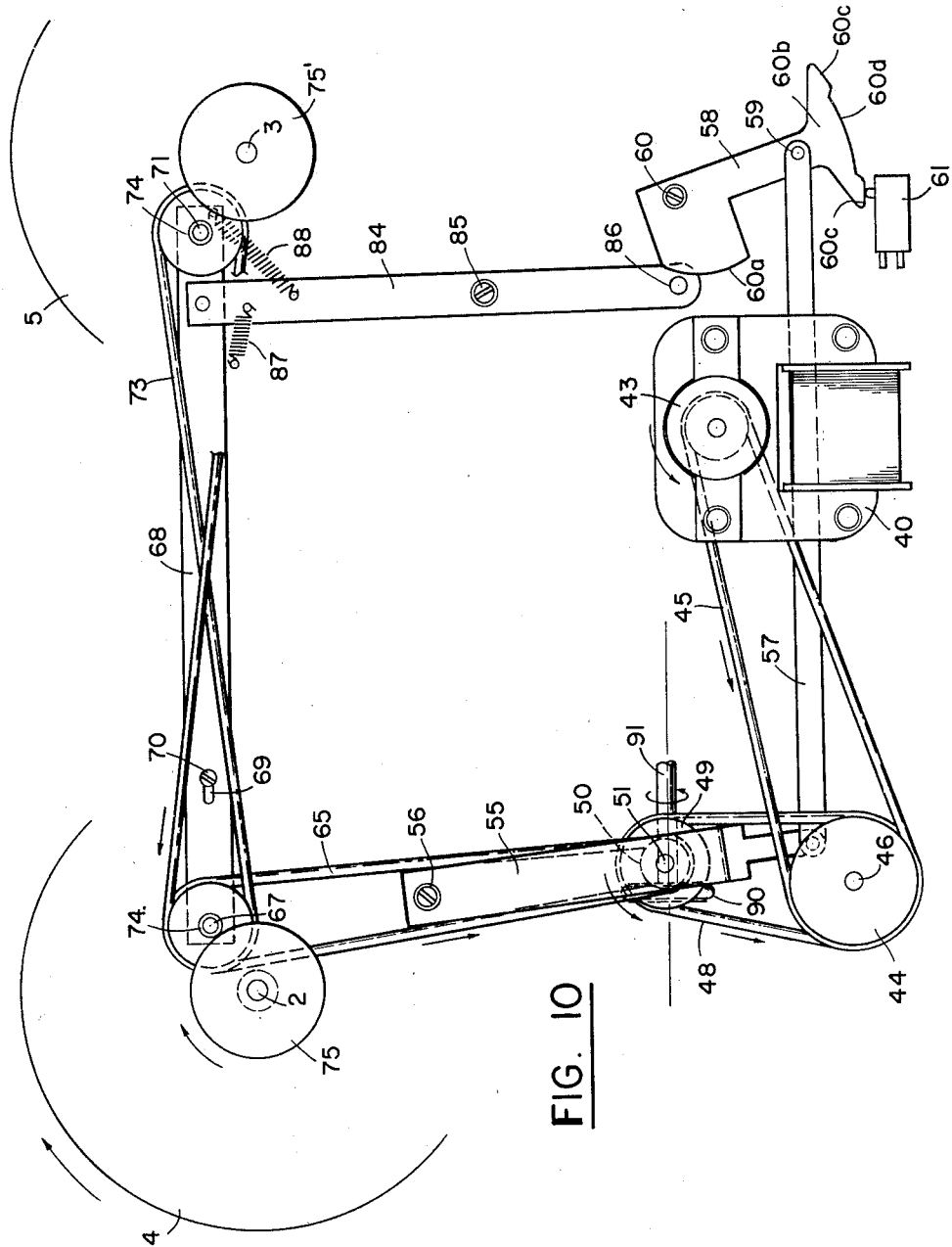
FIG. 10 is a view similar to FIG. 8 and showing the transmission means set for normal speed reverse drive.

The aforementioned pulley 50 on shaft 51 is coupled by a transmission belt 65 to a pulley 66 seated on a shaft 67. Shaft 67 in turn is supported on a bar 68 supported on the inside of the front wall of the housing, longitudinally slidable in reference thereto. For this purpose the bar has a slot 69 engaged by a screw 70 threaded into the housing. The possible slidable movement of bar 68 is determined by the length of slot 69. FIG. 5 shows the bar in its middle position and FIGS. 9 and 10 show the bar in the left-hand and right-hand limit position, respectively, as is apparent from observing the position of slot 69 in reference to screw 70.

The end of bar 68 opposite to the end mounting shaft 67 mounts a second shaft 71 which in turn seats a pulley 72. Pulley 72 is coupled to pulley 66 by a preferably crossed transmission belt 73. To accommodate the second transmission belt on pulley 66 the same is designed as a double pulley as is clearly shown in FIG. 8. Of course, two separate pulleys for belts 65 and 73 may be seated on shaft 67. Each of the shafts 67 and 71 further seats a driving sleeve 74 (see FIG. 8). This sleeve which is preferably made of rubber or any other slightly elastic high friction material, may be moved into or out of driving engagement with a disc 75 and 76, respectively, fixedly secured on reel spindle 2 and 3, respectively. Disc 75 is shown as being secured by means of a set screw 77. Sleeve 74 may be fixedly secured to its shaft 67, but it is preferable to seat the sleeve by means of a slip clutch and such is shown. The clutch comprises a high friction disc 80 against which is pressed sleeve 74 by means of a loaded compression spring 81. One end of the spring abuts against a shoulder of sleeve 74 and the other end is secured to shaft 67 by means of a washer and a cotter pin or any other suitable means. The slip clutch serves to prevent an excessive tension on a film being transported through the machine. FIG. 8 shows the assembly for spindle 2. The assembly for spindle 3 is the same except that pulley 72 is a single pulley.

Bar 68 is pivoted at 83 to a bar 84 which in turn is pivoted to the housing wall at 85. The free end of bar 84 mounts a cam follower pin 86 which coacts with camming surface 60a. This camming surface is so shaped that pin 86 rides along it when lever 58 is in any of the positions between the middle position of FIG. 5 and the position of FIG. 9, but loses contact with the camming surface when lever 58 is turned from the position of FIG. 5 into the position of FIG. 10. For this purpose the camming surface is eccentric in reference to pivot point 60 and is flattened at 60a'.

The linkage system formed by bars 55, 68 and 84 is preferably loaded by means of springs 87 and 88.

As can best be seen in FIG. 5, one face of pulley 49 seated on shaft 51 is frictionally engaged by a wheel 90 seated on a shaft 91 which also supports a claw assembly 92 of conventional design and indicated by its housing, and a shutter blade 93. Both the claw assembly and the shutter blade rotate in unison with shaft 91 and perform the functions conventional in motion picture film projecting apparatus of the kind here involved. The rotational speed and direction of shaft 91 are controlled by the point of engagement of wheel 90 in reference to the rotational axis of pulley 49. To vary this point of engagement, shaft 51 seating pulley 49 can be displaced by pivoting bar 55 about its pivot 56. FIG. 5 shows wheel 90 in registry with the rotational axis so that a rotation of pulley 49 will not transmit rotation to wheel 90. FIG. 9 shows wheel 90 in one limit position of maximum radial distance from the rotational axis of pulley 49 so that wheel 90 and with it shaft 91 and the shutter and claw assemblies will be driven at maximum rotational speed in one direction and FIG. 10 shows wheel 90 in its opposite limit position so that shaft 91 will be rotated at the maxmum speed in opposite direction.

It is sometimes necessary in apparatus of the kind here involved to adjust the position of the claw assembly and the shutter blade either before the apparatus is started or during editing, when a frame is not centered or obturated by the position of the shuter blade. For this purpose, a bar 94 is provided (see FIG. 5) terminating in a blade 95 which can be inserted in a slot 96 formed in the face of shaft 91. Bar 94 is longitudinally displaceable and can be turned from the outside of housing 1 by means of a knob 97. A spring 98 urges bar 94 into a longitudinal position in which its blade 95 is disengaged from slot 96. To adjust the shuter blade and the claw assembly while shaft 91 is at a stand-still, bar 94 is pushed inwardly and turned by means of knob 97 through an appropriate angle.

It is sometimes advisable to effect re-winding of the film at an increased rate of speed and an arrangement suitable for that purpose will now be described.

*Fast Re-Wind Assembly*

Figure 11:
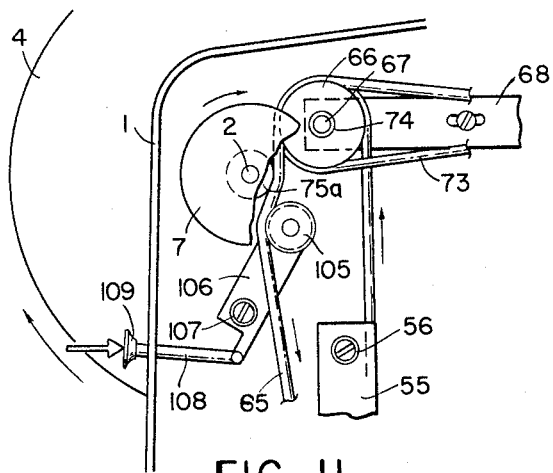
FIG. 11 shows the part of transmission means provided for effecting fast rewind.

FIG. 11 shows the fast re-wind assembly. As is apparent from the previous description, the normal rate of re-wind is controlled by the ratio of transmission between drive sleeve 74 and the much larger spindle wheel 75. The rate of rotation of sleeve 74 is controlled by the rotational speed of motor 40 which is constant. According to FIG. 11, belt 65 can be forced in direct driving engagement with a small wheel 75a on spindle 2. As is evident, a direct drive of small wheel 75a by belt 65 will substantially increase the re-wind speed of spindle 2. To effect driving engagement between belt 65 and wheel 75a an idler 105 is mounted on a lever 106 pivotal about a pivot 107 mounted in a housing wall. Lever 106 is biased into a position in which idler 105 is disengaged from belt 65 and can be forced into a position of engagement by means of a push rod 108 operable from the outside of the housing by pressing against a knob 109.

*Transport Means for Film*

Figures 13, 14:
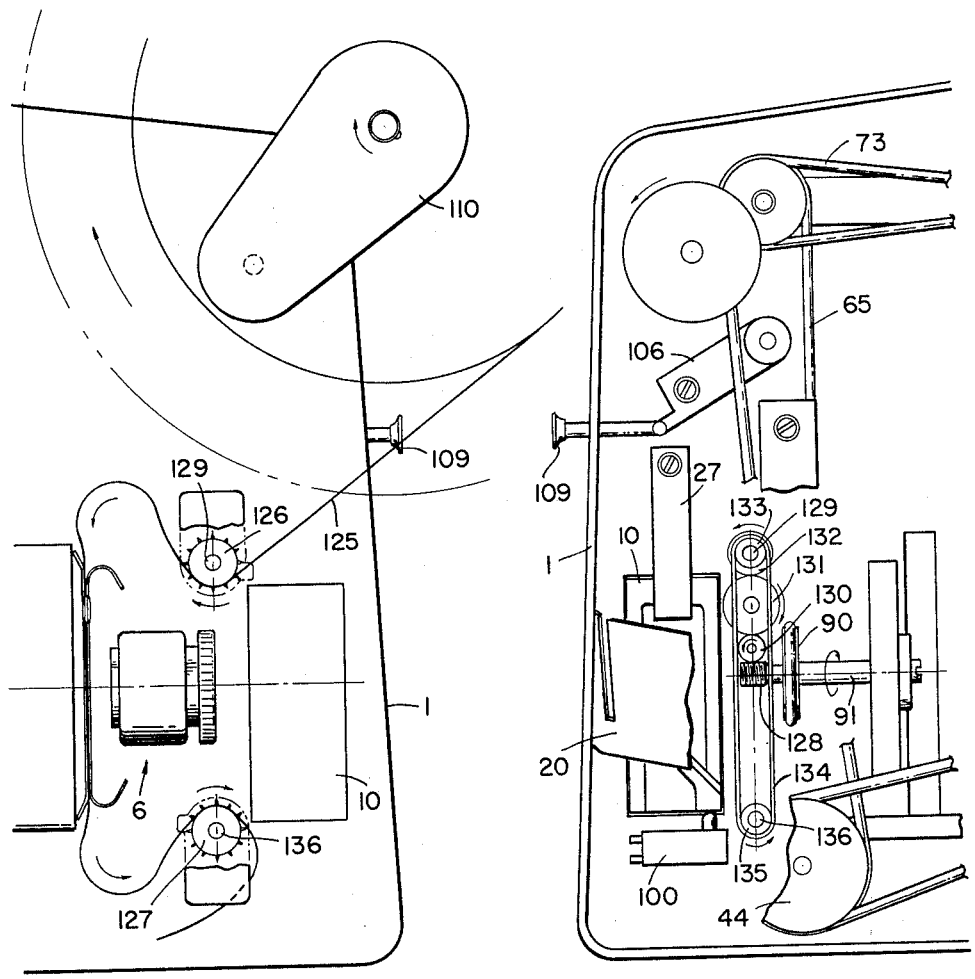
FIG. 13 is a fragmentary enlarged view of the apparatus showing part of the film transport means thereof.
FIG. 14 shows the transport means of FIG. 13 in detail.

FIGS. 13 and 14 show transport means for pulling a motion picture film 125 to be edited or viewed through the apparatus, in addition to the pull exerted by the respective driven reel. The transport means further serve to assure that the film is correctly looped ahead and behind the optical system 6 of the apparatus.

The transport means, as shown, comprises sprocket wheels 126 and 127 disposed on the front wall of housing 1. The drive for the sprocket wheels is derived from shaft 91 mounting a worm 128 which drives shaft 129 of sprocket wheel 126 through gears 130, 131 and 132.

Shaft 129 further seats a pulley 133 which is coupled by a belt 134 with a pulley 135 seated on shaft 136 of sprocket wheel 127. As is apparent, the speed and the direction of the film transport are controlled by the rotational speed and direction of shaft 91. The drive for shaft 91 has been previously described.

Reel Assembly

Figure 15:
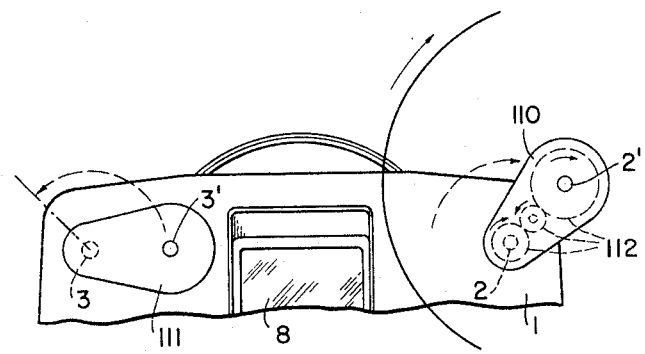
FIG. 15 is a modification of the reel spindle arrangement shown in FIG. 1, provided to accommodate larger reels.

The apparatus according to the invention also includes provisions for accommodating larger reels, or in other words, reels capable of storing and receiving longer motion picture films. Such arrangement for accommodating larger reels is shown in FIG. 15. It comprises brackets 110 and 111 mounted on spindles 2 and 3, respectively. Each of the brackets mounts a reel spindle 2' and 3', respectively. These spindles are coupled with spindles 2 and 3 by a gear train 112 indicated for bracket 111. The gear train will transmit the rotation of spindles 2 and 3 to spindles 2' and 3', respectively. Each bracket which forms a housing for the respective gear train, is pivotal about the spindle 2 or 3 with which it is associated. The pivotal movement of each bracket is limited by a suitable limit means such as a slot in the bracket and a pin protruding from a housing wall and engaging the slot.

Electrical Circuit System of the Apparatus

Figure 16:
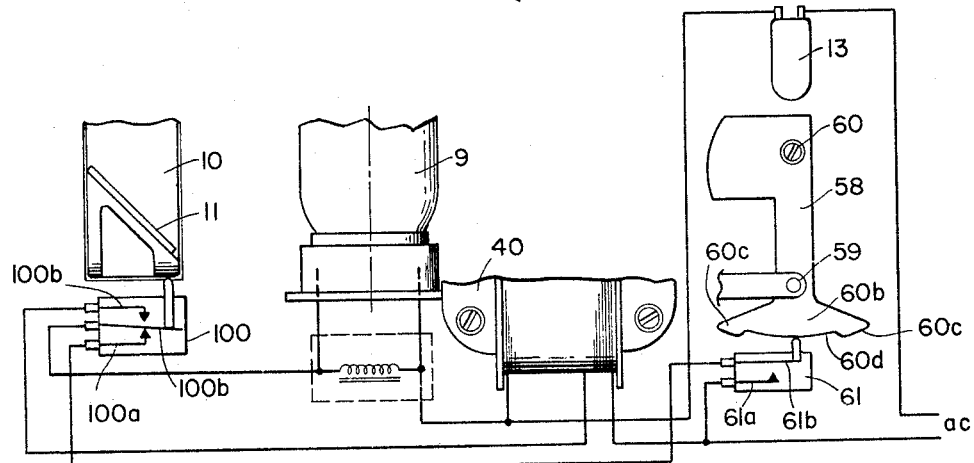
FIG. 16 is a partial diagram of the circuit system of the apparatus.

The circuit system is diagrammatically shown in FIG. 16. It is controlled by switch 61 and a switch 100. Switch 61 in turn is controlled by the position of control lever 58 and switch 100 is controlled by the open and closed position, respectively, of door plate or arm 10.

Switch 61 has a stationary contact 61a and a movable contact 61b and is a normally open switch. Switch 100 has two stationary contacts 100a and 100b and a movable contact 100c. Contact 100c is normally in a position engaging the upper contact 100b.

FIG. 16 shows door 10 in its closed position which is the position for projection on the remote screen. In this position of the door, switch contact 100c is forced into the position engaging contact 100a. Control lever 58 is shown in its up and down position in which switch contact 61b is free to occupy its position disengaged from contact 61a. It is assumed in FIG. 16 that switch 13 is closed by turning upwardly the switch toggle shown in FIG. 1. The field winding of motor 40 is shown to be tapped and a choke is shown to be connected across the terminals of lamp 9 to protect the same from current surges. When the circuit as shown is traced, it is apparent that the motor is energized so that the motor will run, but the light circuit is interrupted at switch contact 100b. If now lever 58 is pivoted either in one direction or the other direction, but within the limits of the recessed surface portion 60d, no change occurs, that is, the lamp circuit will not be closed. However, if the control lever is turned through such an angle that either one of its raised surface portions 60c engages switch contact 61b a circuit for lamp 9 is closed at switch 61. A tracing of this circuit shows that the lamp is at full potential, that is, it is illuminated at full brightness.

Assuming now that door 10 is opened for projection on the internal screen of the apparatus, then contact 100c will engage contact 100b. As a result, the light circuit is closed in any position of control lever 58, but the light circuit is now closed through the tapped portion of the field winding only. Consequently, the lamp is at a reduced potential and burns with a correspondingly reduced brightness in any position of control lever 58.

Operation of the Apparatus

The apparatus as hereinbefore described operates as follows:

Let it be assumed that it is intended to project motion picture film 125 threaded in the apparatus in a convenal manner upon remote screen 8b and that, accordingly, the door plate or arm 10 is closed. Let it further be assumed that levers 12 and 58 are in the up and down position and that motor 40 is started by closing toggle switch 13. To effect projection lever 12 is turned in clockwise direction as shown in FIG. 2, that is, towards the position marked "forward." While lever 58 is being so turned the cam follower pin 86 rides along camming surface 68, thus turning bar 84 and the entire linkage assembly associated therewith into a position in which driving sleeve 74 is in frictional engagement with spindle wheel 75. This position is shown in FIG. 9. Due to the pivoting of the linkage assembly, bar 55 is also pivoted and moves gradually from the position of FIG. 5 into the position of FIG. 9, thus starting rotation of shaft 91 and with it of the shutter and claw assemblies until both the assemblies reach the full operational speed when occupying the position according to FIG. 9. During the initial part of the turning of control lever 58, lamp 9 remains extinguished as previously described in connection with FIG. 16, but becomes illuminated with full brightness as soon as the respective surface portion 60c engages switch 61. Projection now proceeds in the usual manner.

When it is desired to shift from projection upon external screen 8b to projection upon internal screen 8, all that is necessary is to open the door plate 10. Opening of the door plate interposes mirror 11 in the path of the beam and moves shield 35 in front of the lens system as previously described.

Starting again with the position of control lever 58 as shown in FIG. 5 and assuming that toggle switch 13 is closed, then the motor will run, thus providing cooling by means of fan blades 41, the heat shield 35 is in front of the film and an image of the frame in front of the lens system will be projected upon viewing screen 8. The film is stationary and hence the image of the same frame will be continued to be projected. As previously pointed out in connection with FIG. 16, the light is turned on at reduced brilliance as soon as switch 13 is closed. When control lever 58 is now turned toward the forward position, film transport and rotation of the shutter and claw assemblies begin. Any desired rate of speed at which successive frames are projected upon screen 8 can be effected by varying the angular position of control lever 58 in the "forward" direction which controls the pressure of the rotation transmitting frictional engagement of sleeve 74 with wheel 75 and thus the speed thereof. Similarly, the film can be run in "reverse" at any desired rate of speed by turning lever 58 slowly toward the position marked "reverse" in FIG. 2.

Re-winding of the film can be effected as just described, but if it is desired to re-wind the entire film rather than only small sections thereof for inspection during editing, it is preferable to close door 10 before re-winding the film since such closing will extinguish the lamp except in the limit position of lever 58.

As is evident from the previous description, turning of lever 58 toward its reverse position will move the entire linkage assembly from the position of FIG. 5 into the position of FIG. 10 in which drive sleeve 74 on shaft 67 is in engagement with spindle wheel 75.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. An apparatus for selectively projecting motion picture film upon a surface separate from the apparatus and upon a viewing screen on the apparatus, said apparatus comprising a projection unit including a source of light producing a light beam for projecting a sequence of standing images of successive frames of motion picture film for viewing on the surface separate from the apparatus, a viewing screen on the apparatus, an optical assembly for deflecting the image projecting light beam of said projecting unit upon said viewing screen, said optical assembly including an optical linking element and mounting means supporting said linking element pivotal into and out of a position intercepting said beam, and light control means for operating said light source at full intensity or reduced intensity, said control means coacting with said linking element for control by the position thereof to operate the light source at reduced intensity when said linking element is in its beam intercepting position and at full intensity when said linking element is in its position withdrawn from the path of the beam.

2. An apparatus for selectively projecting motion picture film upon a surface separate from the apparatus and upon a viewing screen on the apparatus, said apparatus comprising guide means for guiding motion picture film to be projected through the apparatus, a projection unit including a source of light producing a light beam for projecting a sequence of standing images of successive frames of motion picture film for viewing on the surface separate from the apparatus, a viewing screen on the apparatus, an optical assembly for deflecting the image projecting light beam of said projecting unit upon said viewing screen, said optical assembly including an optical linking element and mounting means supporting said linking element pivotal into and out of a position intercepting said beam, light control means for operating said light source at full intensity or reduced intensity, said control means coacting with said linking element for control by the position thereof to operate the light source at reduced intensity when said linking element is in its beam intercepting position and at full intensity when said linking element is in its position withdrawn from the path of the beam, and heat shielding means for shielding the film from the heat of said source of light, said shielding means being mounted movable between a shielding position interposed between said source of light and film guided through the apparatus and a position withdrawn from such position, the position of said shielding means being also controlled by the position of said linking element, said shielding means being in the shielding position when the linking element is in its beam intercepting position and in the withdrawn position when the linking element is in its withdrawn position.

3. An apparatus for selectively projecting motion picture film upon a surface separate from the apparatus and upon a viewing screen on the apparatus, said apparatus comprising film guiding means for guiding motion picture film to be projected through the apparatus, an electric light unit for directing a beam of light through successive frames of film guided through the apparatus, optical means interposed in the path of said beam for making viewable on said separate surface a sequence of standing images of successive frames of film guided through the apparatus, a viewing screen on the apparatus, an electrical drive motor having a tapped field winding, transmission means for transmitting the rotation of the motor to the film for moving the film through the apparatus, light deviating means for deflecting the beam to render said standing images viewable on said viewing screen, said light deviating means including a beam deflecting linking element mounted pivotal into and out of a position intercepting the beam after emanating from said optical means, and light control circuit means for operating said light unit at full intensity or reduced intensity, said control circuit means connecting the light unit in circuit with the full field winding of the motor and a tapped winding portion thereof and including a control switch, said switch connecting in one position the light unit to the full field winding and in another position to the tapped winding portion and being controlled by the position of said linking element, the light unit being connected to the full field winding in the position of the linking element withdrawn from the path of the beam and to the tapped winding portion in the position of the linking element intercepting the beam.

4. An apparatus for selectively projecting motion picture film upon a surface separate from the apparatus and upon a viewing screen on the apparatus, said apparatus comprising film guiding means for guiding motion picture film to be projected through the apparatus, an electric light unit for directing a beam of light through successive frames of film guided through the apparatus, optical means interposed in the path of said beam for making viewable on said separate surface a sequence of standing images of successive frames of film guided through the apparatus, a viewing screen on the apparatus, an electrical drive motor having a tapped field winding, transmission means for transmitting the rotation of the motor to the film for moving the film through the apparatus, drive control means for controlling the rate of speed and the direction of the transmission means to move the film selectively in a forward direction for projection and in the reverse direction for rewind, light deviating means for deflecting the beam to render said standing images viewable on said viewing screen, said light deviating means including a beam deflecting linking element mounted pivotal into and out of a position intercepting the beam after emanating from said optical means, and light control circuit means for operating said light unit at full intensity or reduced intensity, said control circuit means connecting the light unit in circuit with the full field winding of the motor and a tapped winding portion thereof and including a first control switch, said control switch connecting in one position the light unit to the full field winding and in another position to the tapped winding portion and being controlled by the position of said linking element, the light unit being connected to the full field winding in the position of the linking element withdrawn from the path of the beam and to the tapped winding portion in the position of the linking element intercepting the beam at reduced intensity, said control circuit means further including a second control switch also controlled by said drive control means to interrupt the light unit circuit when the rate of speed of the film movement in the forward direction is below a predetermined value and the linking element is withdrawn from the path of the beam.

5. An apparatus according to claim 3 wherein spring means retain said pivotal linking element in the beam intercepting position, said element being pivotal into the position withdrawn from the path of the beam by manual pressure exerted upon the linking element against the action of said spring means.

6. An apparatus for selectively projecting motion picture film upon a surface separate from the apparatus and upon a viewing screen on the apparatus, said apparatus comprising film guiding means for guiding motion picture film to be projected through the apparatus and including a supply spindle for a film supply reel and a take-up spindle for a film take-up reel, an electric light unit for directing a beam of light through successive frames of film guided through the apparatus, optical means interposed in the path of said beam for making viewable on said separate surface a sequence of standing images of successive frames of film guided through the apparatus, a viewing screen on the apparatus, rotary drive means for moving the film through the apparatus, transmission means for transmitting the rotation of said drive means to the film, said transmission means comprising an adjustable linkage assembly including a drive member drivingly engageable with said supply spindle for rewind drive of the film, a drive member drivingly engageable with said take-up spindle for forward drive of the film and a movable control member including coupling means coupled with said linkage assembly for moving the same selectively into a position in which the supply spindle is in engagement with the respective drive member, a position in which the take-up spindle is in engagement with the respective drive member and a position in which neither spindle is in engagement with a drive member, light deviating means for deflecting the beam to render said standing images viewable upon said viewing screen, said light deviating means including a beam deflecting linking element mounted pivotal into and out of a position intercepting the beam after emanating from said optical means, light control means for operating said light unit at full intensity or reduced intensity, said light control means being coupled to said pivotal linking element and said movable control member for control of the light unit by the position of said linking element and said control member respectively.

7. An apparatus according to claim 6 wherein said coupling means comprise a cam surface and a cam follower on said control member and linkage assembly respectively, movement of said control member causing said follower to ride along said cam surface, the position of the follower on the cam surface controlling the position of the linkage assembly and thus the position of said drive members in reference to said spindles.

8. An apparatus for selectively projecting motion picture film upon a surface separate from the apparatus and upon a viewing screen on the apparatus, said apparatus comprising film guiding means for guiding motion picture film to be projected through the apparatus and including a supply spindle for a film supply reel and a take-up spindle for a film take-up reel, an electric light unit for directing a beam of light through successive frames of film guided through the apparatus, optical means including rotary shutter means interposed in the path of said beam for making viewable on said separate surface a sequence of standing images of successive frames of film guided through the apparatus, a viewing screen on the apparatus, a rotary drive means, transmission means for transmitting the rotation of the drive means to the film and rotating the shutter means, said transmission means comprising an adjustable linkage assembly including a drive member drivingly engageable with said supply spindle and a drive member drivingly engageable with the take-up spindle, said transmission means further including a driving wheel and a driven wheel in frictional driving engagement with the driving wheel and drivingly coupled with said shutter means, the driving wheel and the driven wheel being mounted displaceable in reference to each other, the relative position of said wheels controlling the rate of rotation of said shutter means, and a movable control member including coupling means coupled with said linkage assembly for moving the same selectively into a position in which the supply spindle is in engagement with the respective drive member, a position in which the take-up spindle is in engagement with the respective drive member and a position in which neither spindle is in engagement with a drive member, said movement of the linkage assembly also controlling the relative position of said driving wheel and said driven wheel, light deviating means for deflecting the beam to render said images viewable on said viewing screen, said light deviating means including a beam deflecting linking element mounted pivotal into and out of a position intercepting the beam after emanating from said optical means, light control means for operating said light unit at full intensity or reduced intensity, said light control means being coupled to said pivotal linking element and said movable control member for control of the light unit by the position of said linking element and said control member respectively.

9. An apparatus according to claim 8 wherein said driven wheel is seated on a common shaft with said shutter means and frictionally engages one of the faces of the driving wheel, and wherein said driving wheel is supported on an arm pivotally mounted on said linkage assembly, the position of said linkage assembly controlling the angular position of said arm and said angular position controlling the position of the driven wheel in reference to the rotational axis of the driving wheel.

10. An apparatus according to claim 9 and comprising manually operable shutter adjustment means movable into and out of a position of driving engagement with the shutter means for manually turning the latter independently of said transmission means, and spring means biasing said adjustment means out of engagement with said shutter means.

11. An apparatus according to claim 10 wherein said shutter adjustment means comprise a longitudinally displaceable bar, said common shaft and said bar terminating in members engageable with each other for drivingly coupling the shaft and the bar.

12. An apparatus according to claim 8 and comprising film transport means, said transport means including a sprocket wheel engageable with the film to be transported and a shaft also seating said driven wheel and said shutter means.

13. An apparatus for selectively projecting motion picture film upon a surface separate from the apparatus and upon a viewing screen on the apparatus, said apparatus comprising guide means for guiding motion picture film to be projected through the apparatus, said guide means including a supply spindle for a film supply reel and a take-up spindle for a film take-up reel, a projection unit including a source of light producing a light beam for projecting a sequence of standing images of successive frames of motion picture film for viewing on the surface separate from the apparatus, a viewing screen on the apparatus, an optical assembly for deflecting the image projecting light beam of said projecting unit upon said viewing screen, said optical assembly including an optical linking element and mounting means supporting said linking element pivotal into and out of a position intercepting said beam, light control means for operating said light source at full intensity or reduced intensity, said light control means coacting with said linking element for control by the position thereof to operate the light source at reduced intensity when said linking element is in its beam intercepting position and at full intensity when said linking element is in its position withdrawn from the beam, rotary drive means for moving the film through the apparatus, and transmission means for transmitting the rotation of said drive means to the film, said transmission means comprising an adjustable linkage assembly including a first drive member drivingly engageable with said supply spindle and a second drive member drivingly engageable with said take-up spindle, and drive control means for controlling said linkage assembly to move the same selectively into a position in which the supply spindle is in engagement with the first drive member, a position in which the take-up spindle is in engagement with the second drive member and a position in which neither spindle is in engagement with a drive member, said light control means further coacting with said drive control means for control of the intensity of said light source in accordance with the position of said linkage assembly.

14. An apparatus according to claim 13 wherein said drive control means comprises a movable control member having a cam surface and a cam follower on said linkage assembly, movement of said control member causing said follower to ride along said cam surface, the position of the follower on the cam surface controlling the position of the linkage assembly and thus the position of said drive members in reference to said spindles.

15. An apparatus according to claim 13, and comprising heat shielding means for shielding the film from the heat of said source of light, said shielding means being mounted movable between a shielding position interposed between said source of light and film guided through the apparatus and a position withdrawn from such position, the position of said shielding means being controlled by the position of said linking element, said shielding means being in the shielding position when the linking element is in its beam intercepting position and in the withdrawn position when the linking element is in its withdrawn position.

16. An apparatus for selectively projecting motion picture film upon a surface separate from the apparatus and upon a viewing screen on the apparatus, said apparatus comprising film guiding means for guiding motion picture film to be projected through the apparatus, an electric light unit for directing a beam of light through successive frames of film guided through the apparatus, optical means interposed in the path of said beam for making viewable on said separate surface a sequence of standing images of successive frames of film guided through the apparatus, a viewing screen on the apparatus, an electrical drive motor, transmission means for transmitting the rotation of the motor to the film for moving the film through the apparatus, drive control means for controlling the rate of speed and the direction of the transmission means to move the film selectively in a forward direction for projection and in the reverse direction for rewind, light deviating means for deflecting the beam to render said standing images viewable on said viewing screen, said light deviating means including a beam deflecting linking element mounted pivotal into and out of a position intercepting the beam after emanating from said optical means, and light control means controlled by the position of said linking element for connecting the light unit in an energizing circuit effecting full light intensity and an energizing circuit effecting reduced light intensity of the light unit, said light control means including a first control switch connecting in one position the light unit in the full intensity circuit and in another position in the reduced intensity circuit, the light unit being connected in the full intensity circuit in the position of the linking element withdrawn from the path of the beam and in the reduced intensity circuit in the position of the linking element intercepting the beam, said light control means further including a second control switch controlled by said drive control means to interrupt both energizing circuits of the light unit when the rate of speed of the film movement in the forward direction is below a predetermined value and the linking element is withdrawn from the path of the beam.

17. An apparatus for selectively projecting motion picture film upon a surface separate from the apparatus and upon a viewing screen on the apparatus, said apparatus comprising guide means for guiding motion picture film to be projected through the apparatus, said guide means including a supply spindle for a film supply reel and a take-up spindle for a film take-up reel, a projection unit including a source of light producing a light beam for projecting a sequence of standing images of successive frames of motion picture film for viewing on the surface separate from the apparatus, a viewing screen on the apparatus, an optical assembly for deflecting the image projecting light beam upon said viewing screen, said optical assembly including an optical linking element and mounting means supporting said linking element pivotal into and out of a position intercepting said beam, rotary drive means for moving the film through the apparatus, transmission means for transmitting the rotation of said drive means to the film, said transmission means comprising an adjustable linkage assembly including a first drive member drivingly engageable with said supply spindle for rewind drive and a second drive member drivingly engageable with said take-up spindle for forward drive, drive control means for controlling said linkage assembly to move the same selectively into a position in which the supply spindle is in driving engagement with the first drive member, a position in which the take-up spindle is in driving engagement with the second drive member and a position in which neither spindle is in engagement with a drive member, and light control means controlled by the position of said linking element for connecting the light unit in an energizing circuit effecting full light intensity and an energizing circuit effecting reduced light intensity of the light unit, said light control means including a first control switch connecting in one position the light unit in the full intensity circuit and in another position in the reduced intensity circuit, the light unit being connected in the full intensity circuit in the position of the linking element withdrawn from the path of the beam and in the reduced intensity circuit in the position of the linking element intercepting the beam, said light control means further including a second control switch controlled by said drive control means to interrupt both energizing circuits of the light unit when the rate of speed of the film movement in the forward direction is below a predetermined value and the linking element is withdrawn from the path of the beam.

18. An apparatus according to claim 17 wherein said spindles and said drive members are frictionally engageable with each other, the pressure of the frictional engagement controlling the rate of speed transmitted by each drive member to the respective spindle, and wherein said control means is movable between two limit positions, movement of the control means toward one limit position effecting driving of one spindle and movement of the control means toward the other limit position effecting driving of the other spindle, both said spindles being driven at maximal speed when the control means is in one of its limit positions.

19. An apparatus according to claim 17 wherein said drive control means comprise a movable control member having a cam surface and a cam follower on said linkage assembly, movement of said control member causing said follower to ride along said cam surface, the position of the follower on the cam surface controlling the position of the linkage assembly and thus the position of said drive members in reference to said spindles.

20. An apparatus according to claim 19 wherein said control member is movable between two limit positions and further comprises a switch control portion, said control portion actuating said second control switch for closing the full light intensity energizing circuit when the control member is in either limit position.

21. An apparatus for selectively projecting motion picture film upon a surface separate from the apparatus and upon a viewing screen on the apparatus, said film comprising film guide means for guiding motion picture film to be projected through the apparatus, said guide means including a supply spindle for a film supply reel and take-up spindle for a film take-up reel, a light unit for directing a beam of light through successive frames of film guided through the apparatus, optical means including rotary shutter means interposed in the path of said beam for making viewable on said separate surface a sequence of standing images of successive frames of film guided through apparatus, a viewing screen on the apparatus, light deviating means for deflecting the beam to render said images viewable on said viewing screen, said light deviating means including a beam deflecting linking element mounted pivotal into and out of a position intercepting the beam after emanating from said optical means, a rotary drive means, a transmission means for transmitting the rotation of the drive means to the film and rotating the shutter means, said transmission means comprising an adjustable linkage assembly including a first drive member drivingly engageable with said supply spindle and a second drive member drivingly engageable with the take-up spindle, said transmission means further including a driving wheel and a driven wheel, said driven wheel being in frictional driving engagement with said driving wheel and coupled with said shutter means, the driving wheel and the driven wheel being mounted displaceable in reference to each other, the relative position of said wheels controlling the rate of rotation of said shutter means, drive control means for controlling the rate of speed and the direction of the transmission means to move the film selectively in a forward direction for projection and in the reverse direction for rewind, said drive control means being coupled with said linkage assembly for moving the same selectively into a position in which the supply spindle is in engagement with the first drive member, a position in which the take-up spindle is in engagement with the second drive member and a position in which neither spindle is in engagement with a drive member, said movement of the linkage assembly also controlling the relative position of said driving wheel and said driven wheel, and light control means controlled by the position of said linking element for connecting the light unit in an energizing circuit effecting full light intensity and an energizing circuit effecting reduced light intensity of the light unit, said light control means including a first control switch connecting in one position the light unit in the full intensity circuit and in another position in the reduced intensity circuit, the light unit being connected in the full intensity circuit in the position of the linking element withdrawn from the path of the beam and in the reduced intensity circuit in the position of the linking element intercepting the beam, said light control means further including a second control switch controlled by said drive control means to interrupt both energizing circuits of the light unit when the rate of speed of the film movement in the forward direction is below a predetermined value and the linking element is withdrawn from the path of the beam.

22. An apparatus according to claim 21 and further comprising rewind speed control means for controlling the rate of speed transmitted by the transmission means to the take-up spindle, said speed control means including a transmission device having a higher ratio of transmission than the drive member coacting with the supply spindle, said transmission device being movable into and out of engagement with the supply spindle, and actuating means for moving said transmission device into and out of engagement with said spindle, engagement of the transmission device with the supply spindle imparting high speed rewind rate of speed to the same.

23. An apparatus according to claim 22 and further comprising an extension bracket secured to each of said spindles, each of said extension brackets mounting an auxiliary spindle and transmission means for transmitting rotation of the respective spindle to the auxiliary spindle.

References Cited in the file of this patent

UNITED STATES PATENTS

| | | |
|---|---|---|
| 1,209,492 | Power | Dec. 19, 1916 |
| 1,587,955 | Howell | June 8, 1926 |
| 1,911,845 | Owens | May 30, 1933 |
| 1,926,862 | Wellman | Sept. 12, 1933 |
| 1,944,025 | Foster | Jan. 16, 1934 |
| 2,168,761 | Caldwell | Aug. 8, 1939 |
| 2,813,453 | Browder | Nov. 19, 1957 |